A. COHN.
TRIMMING MACHINE.
APPLICATION FILED OCT. 13, 1919.
1,367,656.
Patented Feb. 8, 1921.
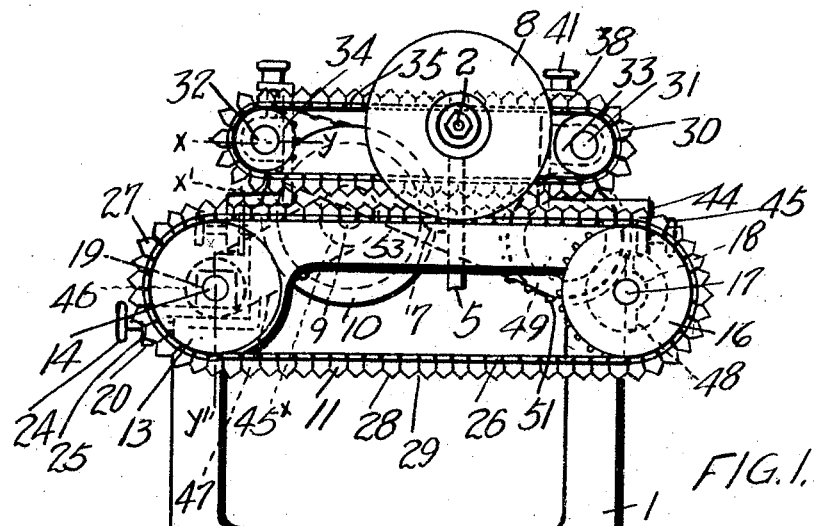
FIG. 1.
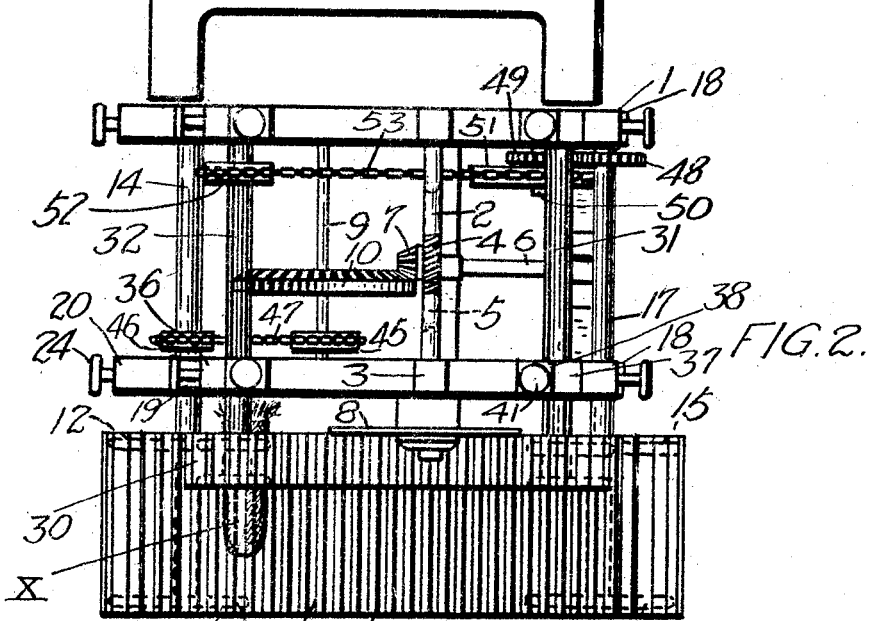
FIG. 2.
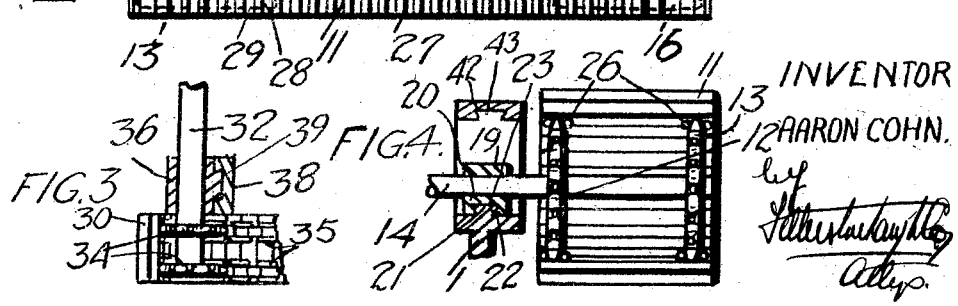
INVENTOR
AARON COHN.

UNITED STATES PATENT OFFICE.

AARON COHN, OF TORONTO, ONTARIO, CANADA.

TRIMMING-MACHINE.

1,367,656.　　　　Specification of Letters Patent.　　Patented Feb. 8, 1921.

Application filed October 13, 1919. Serial No. 330,186.

*To all whom it may concern:*

Be it known that I, AARON COHN, residing at Toronto, in the county of York, in the Province of Ontario, Canada, have invented certain new and useful Improvements in Trimming-Machines, of which the following is the specification.

My invention relates to improvements in trimming machines and the object of the invention is to devise a simple and rapid means for trimming off the loose ends of the stuffing and cover of stuffed doll parts so as to form an even and finished end and it consists essentially of the arrangement and construction of parts as hereinafter more particularly explained.

Figure 1, is a front elevation of my trimming machine.

Fig. 2, is a plan view of the machine as shown in Fig. 1.

Fig. 3, is a sectional detail on line $x$—$y$ Fig. 1.

Fig. 4, is a sectional detail on line $x'$—$y'$ Fig. 1.

In the drawings like characters of reference indicate the various parts in each figure.

1 indicates the frame of the machine. 2 is a shaft journaled in the standards 3 carried by the frame 1. 4 is a worm formed upon the shaft 2. 5 is a worm wheel secured to a shaft 6 journaled in the main frame. 7 is a bevel pinion formed integral with the worm wheel 5 so as to revolve therewith. 8 is a cutting disk which is mounted on the end of the shaft 2 protruding outwardly from the main frame. 9 is a shaft also journaled in the main frame on which is mounted a bevel gear 10 meshing with the bevel pinion 7. 11 is a conveyer which is mounted upon sprocket wheels 12 and 13 secured to a shaft 14 journaled in the main frame. The opposite end of the conveyer is mounted upon sprocket wheels 15 and 16 secured to the shaft 17 journaled in the main frame.

The shaft 17 is journaled in stationary bearings 18 indicated by dotted lines in Fig. 1. The shaft 14 is carried upon a movable bearing 19 which is supported upon a slide 20 in slidable engagement with the portion 21 of the main frame, such portion being provided with a guiding rib 22 in which engages the corresponding groove 23 in the slide 20. 24 is an adjusting screw turnably secured to the depending portion 25 of the slide 20 and bearing at its end against the main frame. By this means the shaft 14 may be adjusted to or away from the shaft 17 to tighten or loosen the belt 11 as required. The belt 11 is formed by a pair of endless sprocket chains 26 the links of one chain being in alinement with the links of the other chain the alined links being connected together by cross slats 27 the longitudinal edges of which are chamfered off forming an angular rib portion 28 and an intervening angular recess 29 between each slat.

30 is an upper belt which forms a holding belt and is comparatively narrow and of less length than the belt 11 but is similarly constructed. 31 and 32 are the supporting shafts of the upper belt and upon which are secured sprocket wheels 33 and 34 which engage the endless chains 35 of the belt 30. The bearings 36 and 37 in which the shafts 31 and 32 are journaled are supported so that they may be adjusted either vertically or in a horizontal direction. In order to provide for this adjustment I have provided brackets 38 extending upwardly from the main frame. Each bracket 38 is provided on its vertical portion with a vertical groove 39 engaging a corresponding rib formed in each bearing 36 and 37. 41 are adjusting screws extending through the upper portion of each bracket 38 and into each bearing 36 and 37. By adjusting the screws the bearings 36 and 37 may be either raised or lowered as required in order to increase or decrease the space between the belt 30 and the belt 11 so as to provide for holding doll parts of various thicknesses. In order to decrease or increase the tension of the belt 30 the lower portion of each bracket 38 is provided with a longitudinal groove 42 engaging the rib 43 formed on the upper portion of the main frame. The outer end of each bracket 38 is provided with a depending portion 44 in which is held an adjusting screw 45 bearing at its inner end against the main frame. The lower belt 11 is driven from the shaft 9 by means of a sprocket wheel 45× secured to such shaft and a sprocket wheel 46 secured to the shaft 14 of the conveyer 11. The sprocket wheels 45 and 46 are connected together by a sprocket chain 47.

It will be noted that the sprockets of the upper or holding conveyer 30 are half the size of the sprockets of the lower conveyer and as both conveyers must be driven at the same rate of speed it is necessary to increase the driving ratio and also in order to provide the inward feed to the stuffed doll's part to drive the upper conveyer in the reverse direction to the lower conveyer.

In order to do this I have provided the gear wheel 48 secured to the shaft 17 and gear wheel 49 mounted upon a suitable stud shaft 50 and in mesh with the gear wheel 48, a large sprocket gear 51 also mounted upon the stud shaft 50 and a sprocket gear 52 mounted upon the shaft 32 of the upper conveyer. The sprocket gear 51 and the sprocket gear 52 are connected together by a sprocket chain 53.

It will thus be seen that all that is necessary to do in order to trim the doll's part after it has been stuffed is to place such part as indicated at X upon the belt 11 with the end to be trimmed protruding inwardly from the edge of the belt 11. The operator holds the stuffed part in this position until it is engaged by the upper belt 30 which serves to grip the part holding it securely and carrying it forward into engagement with the revolving cutter 8. As soon as the part X has been engaged by the belt 30 it may be released by the operator who may place another stuffed part into engagement with the belts 11 and 30. After the end of the part has been trimmed off the trimmed doll's part is discharged at the opposite end of the belt 11 into a suitable receptacle.

From this description it will be seen that I have devised a very simple device whereby dolls' parts may be rapidly trimmed thereby economizing time and labor which is necessary to employ under present conditions and at the same time producing as good if not better result.

What I claim as my invention is:

A trimming machine comprising a frame, pairs of upper and lower conveyer shafts carried by said frame and projecting upon one side thereof, endless conveyers carried by the projecting ends of said shafts, a cutter shaft carried by said frame and projecting upon the same side thereof as the conveyer shafts, a cutter carried by the projecting end of said cutter shaft and having the cutting edge thereof disposed in proximity to the upper run of said lower conveyer, a drive shaft geared to said cutter shaft, a driven shaft geared to said drive shaft, a sprocket drive between the driven shaft and one shaft of the lower conveyer, and a stub shaft geared to the remaining shaft of the lower conveyer and a sprocket gear connection between the stub shaft and one shaft of the upper conveyer.

AARON COHN